J. C. THOMAS.
Corn Planter.
No. 47,468.
Patented Apr. 25, 1865.
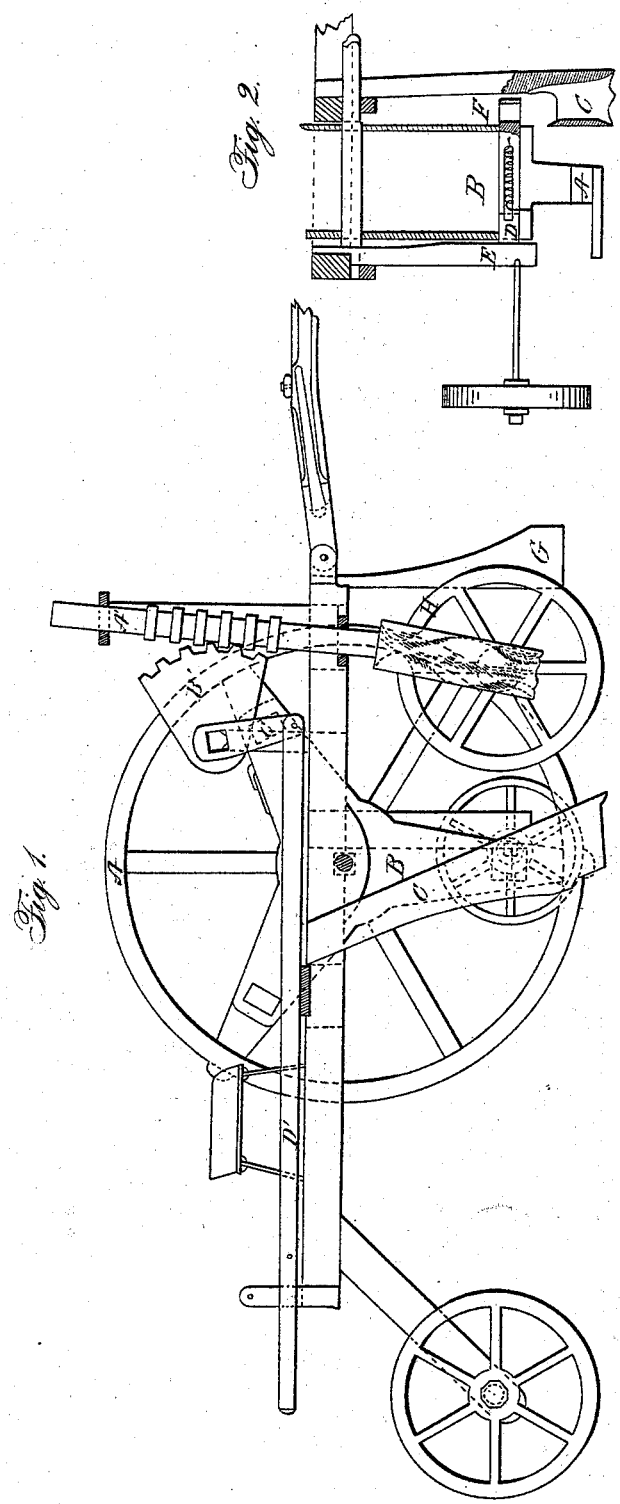

UNITED STATES PATENT OFFICE.

JAMES C. THOMAS, OF REDPOINT, MARYLAND.

IMPROVEMENT IN CORN-PLANTERS.

Specification forming part of Letters Patent No. 47,468, dated April 25, 1865.

*To all whom it may concern:*

Be it known that I, JAMES C. THOMAS, of Redpoint, county of Cecil, in the State of Maryland, have invented a new and Improved Machine for Planting Corn; and I do hereby declare that the following is a full and exact description thereof, reference being had to the accompanying drawings, and to the letters of reference marked thereon.

Figure 1 represents a longitudinal section of the planter, and Fig. 2 a transverse section of the same.

To the wheel A is attached a three-forked seed-box, B, the distance between the arms of which is measured by one-third of the circle. The center of this box is concentric with the wheel A. A hollow tooth, C, is so attached to the frame-work of the planter as to strike the ground directly beneath the axis of the wheel A and sufficiently near to the seed-box B to receive from it the seed every time an arm of the same passes. The seed is then thrown out of the seed-box B by means of a spring-slide, D, striking the bar E, attached to the frame of the planter. In front of Fig. 1 there is a tooth, G, beveled from the inside, intended to level the ground in front of said Fig. 1 as the same moves forward.

Letter H represents a caster-wheel, with a perpendicular shaft, A'. This wheel, H is used to elevate and depress the large wheel, Fig. 1, thereby relieving these wheels from pressure on the ground as the planter is turned in planting. This elevation or depression of said Fig. 1 is made by means of the toothed sector B', operated by means of a lever, C', and the long rod D', the said toothed sector B' working in the revolving rack A', as seen from the drawings in said shaft A'.

What I claim as my invention, and desire to secure by Letters Patent, is—

1. The forked seed-box B, in combination with the wheel A and the hollow tooth C, when constructed substantially as and for the purpose specified.

2. I do not claim the caster-wheel and revolving rack *per se*, these having been before used, but the circular rack A, sector B, lever C, and arm D, when the several parts are constructed and arranged substantially as and for the purpose herein set forth.

Signed this 4th day of July, 1864.

JAMES C. THOMAS.

Witnesses:
W. W. THOMAS,
BOYD TYSON, Jr.